United States Patent Office 3,817,944
Patented June 18, 1974

3,817,944
POLYESTERS WITH ACID END GROUPS
Frank N. Jones, Wilmington, Del., assignor to E. I. du Pont de Nemours and Company, Wilmington, Del.
No Drawing. Filed Apr. 5, 1972, Ser. No. 241,398
Int. Cl. C08g 39/00; C09c 3/02
U.S. Cl. 260—78.3 R                                  4 Claims

ABSTRACT OF THE DISCLOSURE

Polymeric materials represented by the general structure $$\left[ A - \overset{O}{\underset{\|}{C}} - \overset{H}{\underset{}{N}} \right]_m - Y - \left[ \overset{H}{\underset{}{N}} - \overset{O}{\underset{\|}{C}} - B \right]_n$$

where

A is an acid radical having a $pk_a$ value of −1 to 6;
Y is the residue of a di-, tri-, or tetravalent isocyanate radical;
B is a polyester or copolyester segment, and
$m$ and $n$ are 1, 2 or 3, useful as pigment dispersing aids.

STATEMENT OF THE INVENTION

This invention relates to polymeric materials. It is more particularly directed to polymeric materials represented by the structure (1)
$$\left[ A - \overset{O}{\underset{\|}{C}} - \overset{H}{\underset{}{N}} \right]_m - Y - \left[ \overset{H}{\underset{}{N}} - \overset{O}{\underset{\|}{C}} - B \right]_n$$

where

A is an acid radical having a $pk_a$ value of −1 to 6;
Y is the residue of a di-, tri- or tetraisocyanate radical;
B is a polyester or copolyester segment (number average molecular weight 500–50,000, preferably 1000–10,000); and
$m$ and $n$ are 1, 2 or 3 (the total not exceeding 4).

Where $m$ is 2 or 3, only one of A need be as defined.

Utility

The polymeric materials of the invention are useful as aids for dispersing solid particles in organic liquids.

They are especially useful as aids for dispersing pigments in organic media. Illustrative of the pigments which can be dispersed are titanium dioxide, carbon black, zinc oxide, lead titanate, potassium titanate, antimony oxide, lithopone, phthalocyanine blue, quinacridone, "Irgazine"® yellow, ferric hydrates and the like.

Pigment dispersions made with the polymeric materials of the invention are remarkably resistant to flocculation, which gives the paints into which the dispersions are incorporated higher initial gloss, better hiding and tinting strength, and makes them resistant to color drift and gloss loss. These pigment dispersions can also be used satisfactorily with many more diverse types of paints than conventional pigment dispersions. Moreover, a dispersion made with a polymeric material of the invention can have a significantly higher pigment content, while retaining the same degree of fluidity, than when conventional aids are used.

The polymeric materials of the invention can be used as pigment dispersing aids by dissolving from 0.001 to about 2.00 grams of polymeric material per square meter [1] of surface area of the pigment to be used, preferably 0.004 to about 0.100 gram per square meter, in an organic liquid compatible with the paint into which the pigment dispersion is to be incorporated. Illustrative of organic liquids which can be used are aliphatic and aromatic hydrocarbons, ethers, esters, ketones, alcohols and mixtures of these.

An appropriate amount of pigment is then added to the solution, which is then subjected to shear or crushing, as by sand-grinding, 2-roll milling or ball-milling, to deagglomerate and disperse the pigment. This pigment dispersion or mill base can then be added directly to a paint in the usual way and amount.

The polymers of the invention can also be used to disperse pigments and dyes in film-forming polymers. They are especially useful in dispersing carbon black in polyesters, where they minimize filter-clogging and enhance fiber color.

Polymeric materials of the invention preferred for these uses are those of formula (1) wherein A is a mercapto-, hydroxy- or carboxy substituted carboxylic acid radical. Especially preferred are those materials where A is $$-S-\underset{\underset{CH_2COOH}{|}}{C}-COOH$$

$$-S-(CH_2)_n-COOH$$

(where $n$ is 1–3)

$$-O-\underset{\underset{(CH_2)_5CH_3}{|}}{CH(CH_2)_{10}COOH}$$

$$-O-CH_2CH_2\underset{\underset{CH_2CH_2N(CH_2COOH)_2}{|}}{N}-CH_2COOH$$

or $$HN\underset{CH_2COOH}{\overset{CH_2COOH}{<}}$$

Also preferred are those polymeric materials of formula (1) wherein Y is

[structure with piperazine-like rings and $(CH_2)_6$ groups]

[structure with two thiophene-like rings linked by $-CH_2-$]

or

[toluene ring with $H_3C-$ substituent]

The polymeric material most preferred, especially for dispersing carbon black in polyesters, is that represented by the structure $$\begin{array}{c} HOOC-CH_2 \\ | \\ HOOC-CH-S-\overset{O}{\underset{\|}{C}}-\overset{H}{\underset{}{N}}(CH_2)_6\overset{H}{\underset{}{N}}-\overset{O}{\underset{\|}{C}} \\ \\ HOOC-CH-S-\overset{O}{\underset{\|}{C}}-\overset{H}{\underset{}{N}}(CH_2)_6\overset{H}{\underset{}{N}}-\overset{O}{\underset{\|}{C}} \\ | \\ HOOC-CH_2 \end{array} \quad N-(CH_2)_6$$

$$\overset{H}{\underset{}{N}}-\overset{O}{\underset{\|}{C}}\left[O(CH_2)_5\overset{O}{\underset{\|}{C}}\right]_{\sim 26}O(CH_2)CH_3$$

Preparation of the Polymeric Materials

To make the polymeric materials of the invention, a hydroxyl-terminated polyester or copolyester is condensed

---

[1] Measured by the Braunauer, Emmett and Teller nitrogen adsorption method described on pp. 29–32 of "Colloidal Dispersions" by Earl K. Fisher, published by John Wiley and Sons in 1950.

with an equivalent weight of an isocyanate, according to the general equation:

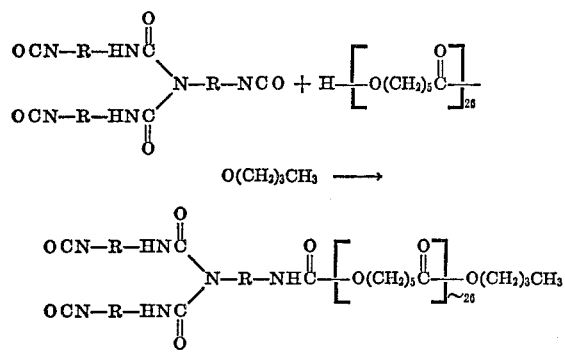

Illustrative of isocyanates which can be used are

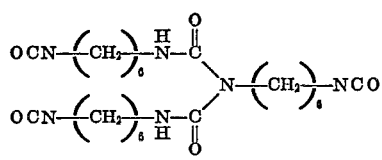

(Desmodur N, sold by Farbenfabriken Bayer, AG.)

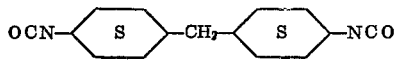

("Hylene"® W organic isocyanate, sold by E. I. du Pont de Nemours and Company)

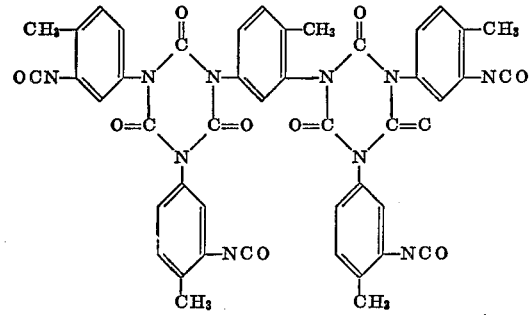

(Desmodur IL, sold by Farbenfabriken Bayer, AG)

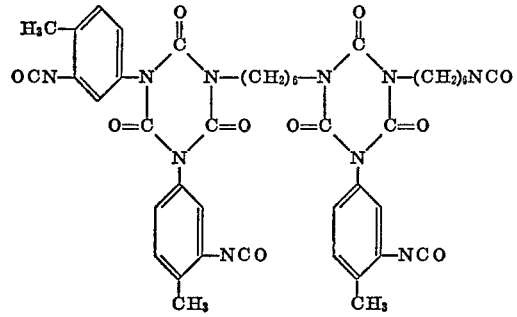

(Desmodur HL, sold by Farbenfabriken Bayer, AG)
and toluene diisocyanate

The hydroxyl-terminated polyester can be prepared by (1) Polymerizing a lactone such as propiolactone, caprolactone or pivalolactone.
(2) Condensing a glycol and a dibasic acid in the presence of a mono-alcohol. The formation of polyesters capped at both ends with hydroxyl groups should be minimized. This can be done by controlling the stoichiometry of the reaction so that the acid number and the hydroxyl number of the polyester are approximately equal.
(3) Condensing a hydroxy acid in the presence of a small amount of mono-alcohol.
(4) Condensing a diol and a mixture of diacids or diesters, a diacid and a mixture of diols, or a mixture of diols and a mixture of diols and diacids Illustrative of these reactions are

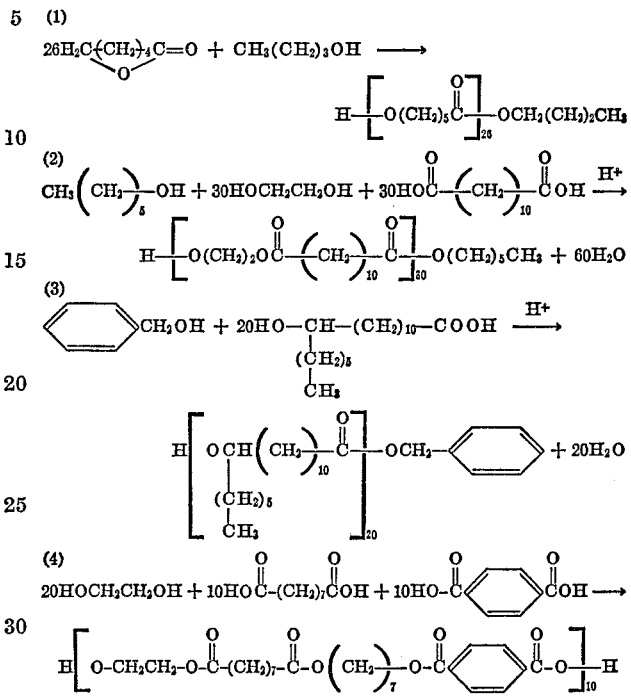

These reactions are described in greater detail in "Preparative Methods of Polymer Chemistry," Sorenson and Campbell, Interscience Publishers, Inc., New York, N.Y. (1961), pp. 111–127 and 242–247 and "Polyesters and Their Applications," Bjorksten Research Laboratories, Inc., Reinhold Publishing Corp., New York, N.Y. (1956).

The polyester thus prepared is dissolved in an inert liquid like anhydrous benzene. The isocyanate is then added, together with about 0.1% (by weight) of dibutyl tin dilaurate. This mixture is heated for about one hour at 80–130° C. The resulting product can be isolated by stripping off the solvent at 100° C. and a pressure of 20 mm.

The reactant which provides the A moiety of the polymeric material is then added to the mixture as a solution, preferably dry, in an organic liquid such as toluene, methyl ethyl ketone, methylisobutyl ketone, butyl acetate, ethyl acetate, benzene, xylene, an ether such as ethylene glycol diethyl ether or Cellosolve acetate, or mixtures of these. The amount used is about 0.8–1, preferably 0.95 molar, based on the unreacted isocyanate. The reaction is then heated at 50–120° C., with stirring, for another fifteen minutes.

This A moiety-providing reactant can be any acid which will leave a residue having a $pk_a$ value of −1 to 6 which bears a radical capable of reacting with an isocyanate, such as —COOH, —SH, —OH and —NH$_2$. Illustrative of these acid reactants are

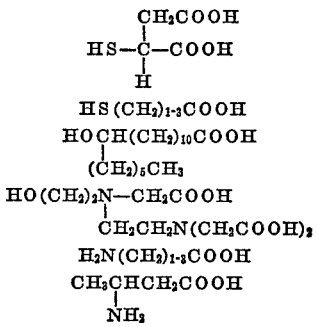

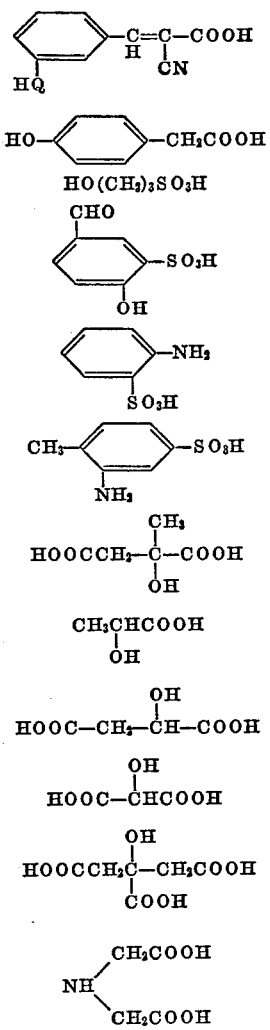

and

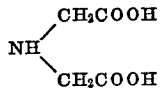

The organic liquid can be stripped from the reaction mass by heating under vacuum to give a polymeric material of the invention, which can range in physical characteristics from a viscous oil to a powdery solid. In practice, the product is ordinarily used in solution, as prepared.

If mixtures of polymeric materials are produced by these reactions, the materials can be isolated by chromatography.

PREFERRED EMBODIMENTS OF THE INVENTION

The following examples are submitted so that the invention may be more readily understood and practiced.

Those skilled in the art will, no doubt, be able to compose numerous variations on their central theme, such as the attachment of innocuous substituents to the polymeric material molecule. It is naturally considered that these variations are a part of the invention.

In the examples, all parts are by weight.

EXAMPLE 1

A mixture of

| | Parts |
|---|---|
| Monohydroxypolycaprolactone [1] | 1500 |
| Toluene | 1500 |

[1] Sold by Union Carbide Co. It has a molecular weight of 3000.

was refluxed for ½ hour. 200 Parts of distillate were collected and discarded.

The resulting product was added to 319 parts of Desmodur N, 1.5 parts of dibutyltin dilaurate were added and the mixture then refluxed for 1½ hours. The mixture was then cooled to 60° C. and a slurry of 149 parts of mercaptosuccinic acid in toluene at 50° C. was added. This mixture was then stirred for 15 minutes at 70° C.

The resulting product had the structure

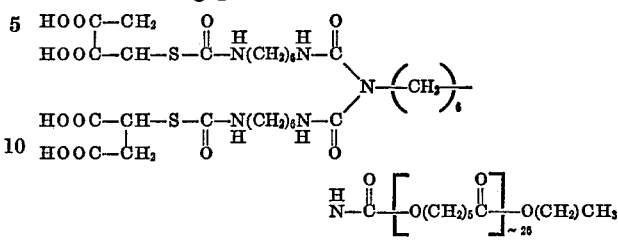

EXAMPLE 2

Sixty-eight and eight-tenths parts of polycaprolactone (molecular weight 2960) were dissolved in 150 parts of anhydrous ethylene glycol dimethyl ether. To this were added 14.8 parts of Desmodur N75. This solution was mixed and 0.2 part of dibutyl tin dilaurate was added. The mixture was then heated for 2 hours at 80° C.

To this were then added 13.9 parts of 12-hydroxy stearic acid, together with 0.1 part of dibutyl tin dilaurate and 50 parts of anhydrous ethylene glycol dimethyl ether. The mixture was heated at 80° C. for 3 hours and then stripped at 100° C. and 20 mm. of pressure to give a waxy solid having the structure

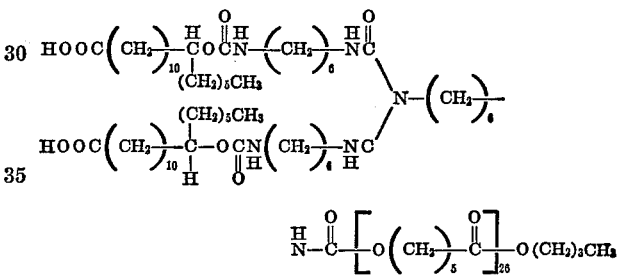

I claim:

1. A polymeric material represented by the structure

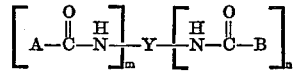

where
A is a moiety which results from removal of a carboxyl, mercapto, hydroxyl, or amino hydrogen from a polycarboxylic acid, mercaptocarboxylic acid, hydroxycarboxylic acid, or aminocarboxylic acid, respectively, the moiety having a $pk_a$ value of −1 to 6;
Y is a moiety which results from the removal of two or more —NCO radicals from a di-, tri- or tetraisocyanate radical;
B is a moiety which results from the removal of a hydroxyl hydrogen from a hydroxyl terminated carboxylic acid polyester or copolyester; and
m and n are 1, 2 or 3 (the total not exceeding 4), provided that when m is 2 or 3 only one of A need be as defined.

2. The polymeric material of claim 1 wherein A is

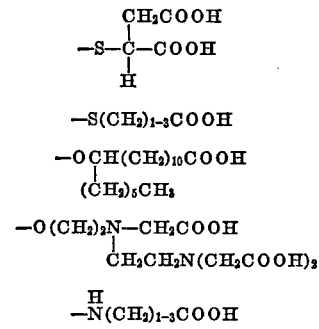

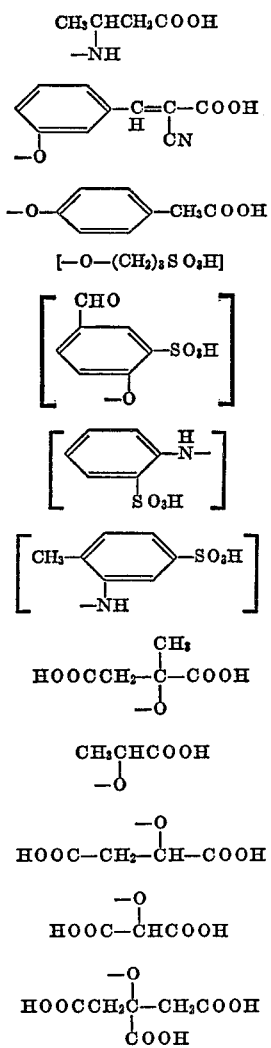

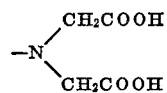

3. The polymeric material of claim 1 wherein Y is

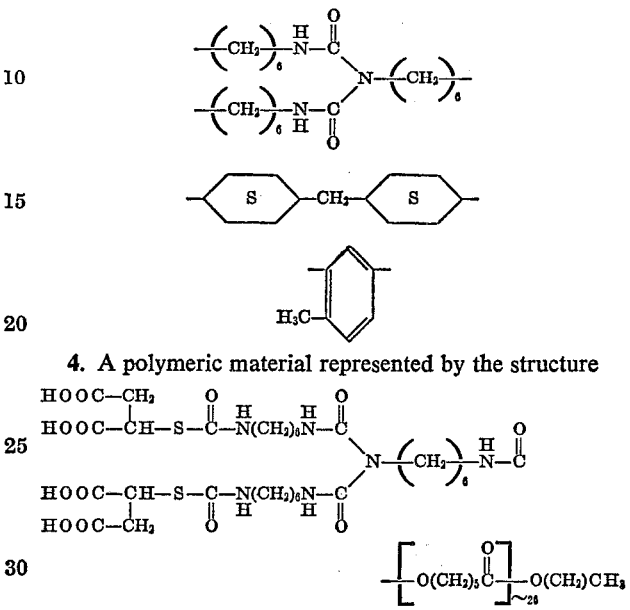

4. A polymeric material represented by the structure $$\begin{matrix} HOOC-CH_2 \\ HOOC-CH-S-\overset{O}{\overset{\|}{C}}-\overset{H}{N}(CH_2)_6\overset{H}{N}-\overset{O}{\overset{\|}{C}} \\ HOOC-CH-S-\overset{O}{\overset{\|}{C}}-\overset{H}{N}(CH_2)_6\overset{H}{N}-\overset{O}{\overset{\|}{C}} \\ HOOC-CH_2 \end{matrix} N{-}(CH_2)_6{-}\overset{H}{N}-\overset{O}{\overset{\|}{C}}\left[O(CH_2)_5\overset{O}{\overset{\|}{C}}\right]_{26}O(CH_2)CH_3$$

References Cited
UNITED STATES PATENTS
2,933,477    4/1960    Hostettler    260—77.5
3,663,515    5/1972    Hostettler et al.    260—77.5 AN WILLIAM SHORT, Primary Examiner
EARL A. NIELSEN, Assistant Examiner U.S. Cl. X.R.

106—308 Q; 260—75 T, 248 NS, 455 A, 471 C, 482 B